United States Patent
Bozorgi et al.

(10) Patent No.: US 6,246,547 B1
(45) Date of Patent: Jun. 12, 2001

(54) LOW PROFILE FLEXURE AND SLIDER-FLEXURE ASSEMBLY

(75) Inventors: Jamshid Bozorgi, Fremont; Mourad Zarouri, San Diego, both of CA (US)

(73) Assignee: Read-Rite Corporation, Milpitas, CA (US)

( * ) Notice: Subject to any disclaimer, the term of this patent is extended or adjusted under 35 U.S.C. 154(b) by 0 days.

(21) Appl. No.: 09/250,142

(22) Filed: Feb. 16, 1999

(51) Int. Cl.[7] .............................. G11B 5/48; G11B 21/16
(52) U.S. Cl. ........................................................ 360/245.3
(58) Field of Search ............................. 360/245, 245.3, 360/245.4, 245.5, 245.6

(56) References Cited

U.S. PATENT DOCUMENTS

| | | | |
|---|---|---|---|
| 5,282,103 | * 1/1994 | Hatch et al. | 360/104 |
| 5,428,490 | 6/1995 | Hagen . | |
| 5,452,158 | 9/1995 | Harrison . | |
| 5,467,236 | * 11/1995 | Hatanai et al. | 360/104 |
| 5,490,027 | * 2/1996 | Hamilton et al. | 360/104 |
| 5,602,699 | * 2/1997 | Khan | 360/104 |
| 5,625,514 | * 4/1997 | Kubo et al. | 360/104 |
| 5,781,379 | * 7/1998 | Erpelding et al. | 360/104 |
| 5,838,517 | * 11/1998 | Frater et al. | 360/104 |
| 5,877,920 | * 3/1999 | Resh | 360/104 |

FOREIGN PATENT DOCUMENTS

| | | |
|---|---|---|
| 1-128278 | * 5/1989 | (JP) . |
| 9-147510 | * 6/1997 | (JP) . |
| 10-162533 | * 6/1998 | (JP) . |

* cited by examiner

Primary Examiner—William Klimowicz
(74) Attorney, Agent, or Firm—Nathan N. Kallman

(57) ABSTRACT

A slider attaches to a low profile flexure to form a slider-flexure assembly. The flexure has no out-of-plane bends thereby minimizing slider-flexure assembly height. The slider has a top, a bottom, a leading edge and a trailing edge. The flexure includes a tongue having a proximal end and a distal end. The distal end of the tongue connects to the top of the slider. The proximal end of the tongue overhangs the leading edge of the slider. The flexure includes gimbal beams that diverge from the proximal end of the tongue so that the gimbal beams suspend the slider from beyond the leading edge of the slider, thus eliminating a need for out-of-plane bends in the flexure.

14 Claims, 2 Drawing Sheets

LOW PROFILE FLEXURE AND SLIDER-FLEXURE ASSEMBLY

FIELD OF THE INVENTION

The present invention pertains to hard disk drive slider-flexure assemblies, and in particular to low-profile flexures.

BACKGROUND OF THE INVENTION

Typical hard disk drives have several rotating disks and an E-block with multiple actuator arms. The actuator arms each support one or more suspension assemblies. A suspension assembly is defined as a load beam, baseplate and flexure. The load beam has two ends. The baseplate enables one end of each load beam to swage to the actuator arm. The flexure supports an air bearing slider at the other end of the load beam. The slider has at least one read/write head. The combination of the flexure and the slider is termed a "slider-flexure assembly".

The E-block pivots the actuator arms along an arc over the disk surface to enable the read/write head to read and write data. When the disk rotates, air pressure lifts the slider to a desired flying height above the disk. The load beam directs a gram load onto the slider in a direction normal to the disk.

Slider and head positioning tolerances with respect to a disk surface have become smaller as data storage densities have increased. To achieve precise head positioning, the sliders are designed with a high degree of pitch and roll compliance. This enables the slider to float freely at the desired flying height. Pivoting the slider with the E-block complicates the slider positioning. Accordingly, it is desirable to fix the slider in axial alignment with respect to the load beam so that when the E-block pivots, the slider does not misalign with the load beam. The slider-flexure assembly functions to allow the slider to pitch and roll while maintaining axial alignment with respect to the load beam.

U.S. Pat. No. 5,452,158 to Harrison et al. shows a flexure-slider assembly, the disclosure of which is incorporated herein by reference. The Harrison et al. patent attempts to improve pitch and roll compliance while restricting translation that could misalign the slider with respect to the load beam. One drawback of the Harrison et al. design is that it includes out-of-plane bends (identified as 43 and 44). This causes the slider-flexure assembly to consume space on two planes. One plane is occupied by the flexure tongue and another plane is occupied by a flexure portion of the slider-flexure assembly.

U.S. Pat. No. 5,428,490 to Hagen et al. shows a slider-flexure assembly. However, the gimbal beams (identified as 58) overhang the lateral sides of the slider, increasing the width of the slider-flexure assembly in the region of the slider. This increased width is undesirable because the overhanging gimbal beams may prevent the slider from reaching centrally defined disk tracks that are adjacent to a spindle.

SUMMARY OF THE INVENTION

An object of this invention is to provided an improved slider-flexure assembly that improves compliance to pitch and roll, restricts undesired slider movement, and consumes only a small amount of space.

Another object of the invention is to provide a reduced slider-flexure assembly.

According to the invention an improved flexure for a head gimbal assembly having a low-profile configuration is provided. The head gimbal assembly includes an E-block with multiple suspensions. Each suspension includes a load beam and an integrated flexure. A slider bonds to each flexure, forming a slider-flexure assembly.

The flexure includes gimbal beams and two ends. The load beam supports one end of the flexure. The slider mounts on the other end. The gimbal beams are distanced from the slider so that the gimbaling of the slider occurs at a position relatively close to the load beam. Gimbaling the slider at a position closer to the load beam allows for a planar flexure configuration. The flexure is planar to eliminate out-of-plane bends and to achieve for a low profile. The flexure of the present invention also minimizes space consumption around the slider to enable the slider to access the innermost disk tracks.

The slider includes a top, a bottom, a leading edge and a trailing edge. The flexure has a tongue that extends to connect with the top of the slider. The gimbal beams extend from the tongue and overhang the leading edge of the slider to perform a gimbaling function at a distance from the leading edge of the slider.

The tongue is relatively narrower than the slider to minimize space consumption by the flexure. The tongue has a defined thickness, and the gimbal beams have a thickness generally equal to the thickness of the tongue to simplify manufacture of the flexure. The thicknesses of the gimbal beam and the tongue may be modified in accordance with design requirements.

According to one aspect of the invention, the gimbal beams flare out, diverging from the tongue. The degree to which the gimbal beams flare is a matter of design, and the degree is sufficient to gimbal the slider, but not too much so as to disturb positioning of the slider over the innermost data tracks of a recording disk.

BRIEF DESCRIPTION OF THE DRAWINGS

The invention will be described in greater detail with reference to the drawings in which.

DETAILED DESCRIPTION OF THE INVENTION

Figure 1:
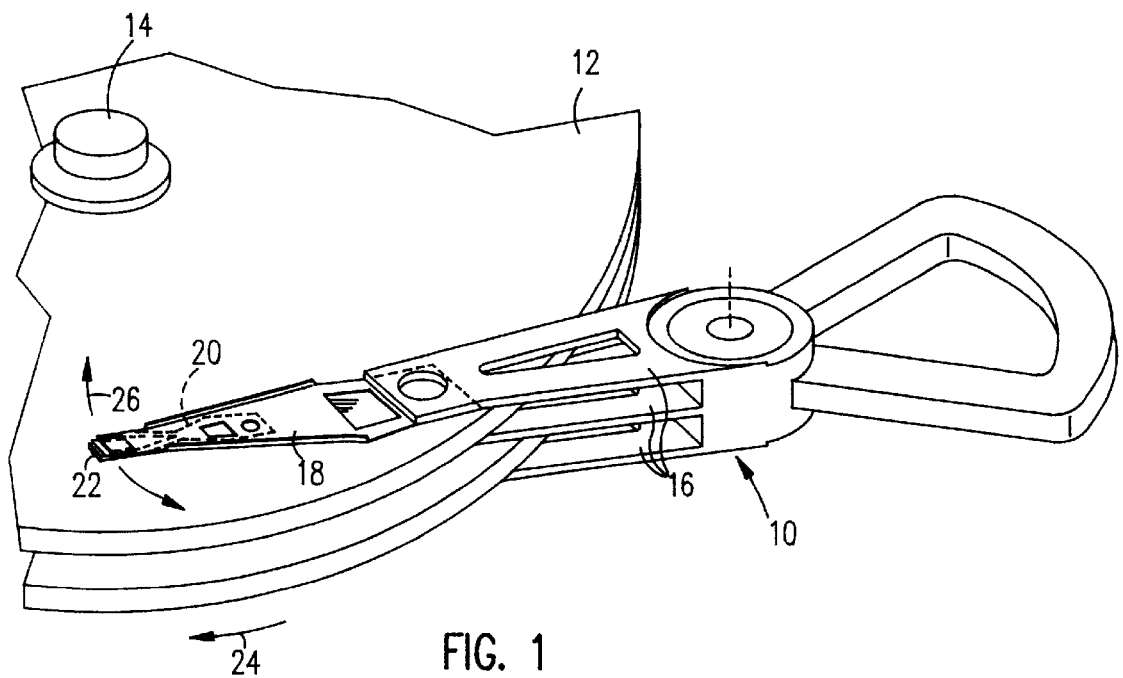
FIG. 1 is a perspective view of a portion of a hard disk drive including an E-block assembly and rotating disks.

FIG. 1 shows a head gimbal assembly including an E-block 10, disks 12, and a disk spindle 14. The E-block has multiple actuator arms 16. Each actuator arm 16 includes one or two load beams 18, a flexure 20 and a slider 22. A flexure 20 attaches to each load beam 18 respectively. The slider 22 includes a read/write head. The flexure 20 supports the slider 22 to enable the read/write head to read and write data.

The disks 12 spin in the direction of the arrow 24. The E-block 10 pivots to reciprocate the actuator arms 16 and move the slider 22 along the arc 26. The load beam 18 applies a gram load on the slider 22 to press the slider 22 towards the disk 12. Disk rotation creates air pressure between the disk 12 and the slider 22 to oppose the gram load and maintain the slider 22 at a desired flying height above the disk 12.

Figure 2:
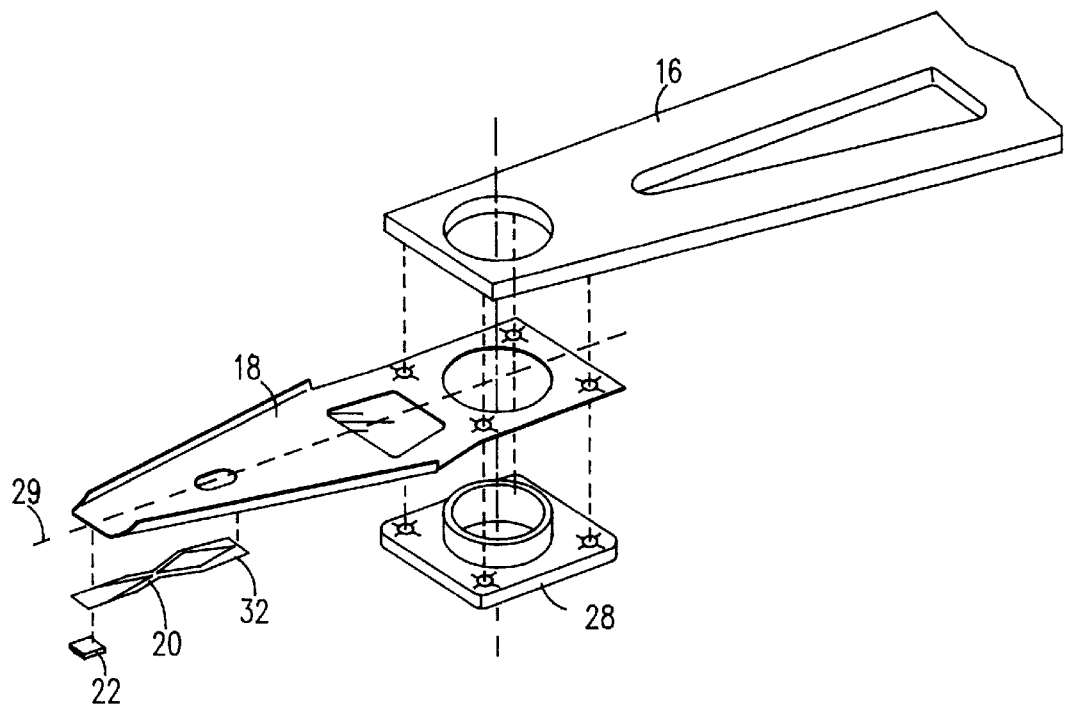
FIG. 2 is an exploded perspective view of an actuator arm, load beam, and slider-flexure assembly in accordance with the present invention.

FIG. 2 shows the actuator arm 16, load beam 18, and flexure 20. The load beam 18 includes an integrated baseplate 28 that holds the load beam 18 and the actuator arm 16 together. The flexure 20 includes a supported end 32 that bonds to the load beam 18 to hold the slider 22 in axial alignment with the load beam 18. The central longitudinal axis of the load beam 18 is designated by the dashed line 29 The slider 22 bonds to the flexure 20, forming a slider-flexure assembly.

Figure 3:
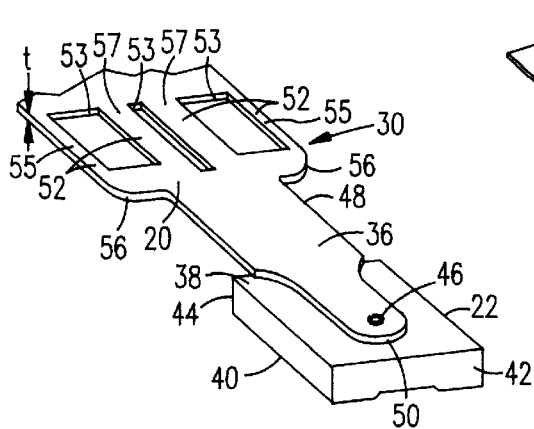
FIG. 3 is a perspective view of a slider-flexure assembly in accordance with the present invention.

FIG. 3 shows a slider-flexure assembly 30 that includes the flexure 20 and a slider 22. The flexure 20 includes a tongue 36. The slider 22 has a top 38, a bottom 40, a trailing edge 42 and a leading edge 44.

The tongue 36 has a load point 46, a proximal end 48 and a distal end 50. The proximal end 48 of the tongue 36 overhangs the leading edge 44 of the slider 22. The tongue 36 narrows from the proximal end 48 to the distal end 50. During normal operation, the load beam 18 (FIG. 1) presses the flexure 20 at the load point 46 to apply a desired gram load on the slider 22. Applying the gram load at the load point allows slider pitch and roll compliance.

The flexure 20 includes gimbal beams 52 that restrain the slider 22 from axial misalignment with respect to the load beam 18 (FIG. 3). The gimbal beams 52 extend in parallel from the proximal end 48 of the tongue 36, away from the slider 22 and towards the supported end of the slider-flexure assembly 30 and allow slider 22 pitch and roll compliance. The tongue 36 overhangs the leading edge 44 of the slider 22 to distance the gimbal beams 52 from the leading edge 44 of the slider 22.

The gimbal beams 52 have a thickness "t" and the tongue has a thickness "t" generally equal to the gimbal beam thickness "t". The gimbal beams 52 lie coplanar with the tongue 36. Forming the gimbal beams 52 with the same thickness of the tongue 36 eases manufacture of the flexure 20. Having the gimbal beam 52 lying coplanar with the tongue 36 minimizes the flexure 20 profile by eliminating the necessity of out-of-plane bends in either the flexure 20 or the gimbal beams 52. The low profile flexure facilitates closer disk spacing when the slider-flexure assembly 30 is incorporated into a hard disk drive.

The slider 22 bonds in alignment to the tongue 36 so that the tongue 36 and the slider 22 pitch with respect to an operational memory storage disk. Pitched, in this context, means the slider trailing edge 42 angles slightly towards the disk surface while the leading edge 44 angles away from the disk surface. This angled arrangement is frequently termed a "positive pitch bias". Positive pitch bias reduces static friction between the slider 22 and a rotating disk to improve disk drive reliability. Positive pitch-bias also enables faster slider take-off during disk start-up because air can readily flow under the leading edge 44 of the slider 22 to instantly lift the slider 22 during disk start-up.

The distal end 50 of the tongue 36 has a generally parabolic shape in an attempt to minimize flexure 20 mass and to optimize slider-flexure assembly function. The gimbal beams 52 include lateral gimbal beams 55 and a pair of central gimbal beams 57 defined between the lateral gimbal beams 55. The gimbal beams 52 are parallel, defining interstices 53 between the lateral gimbal beams 55 and the central gimbal beams 57. The central gimbal beams 57 define an interstice 53 between each other. The interstices 53 are shaped as a matter of design preference to regulate the gimbaling function of the flexure 20.

Figure 4:
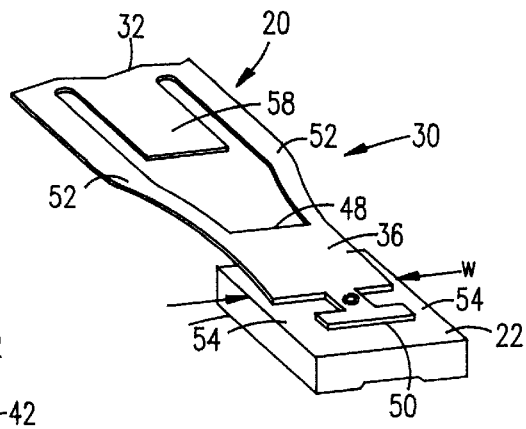
FIG. 4 is a perspective view of an alternative slider-flexure assembly in accordance with the present invention.

FIG. 4 shows an embodiment of the slider-flexure assembly 30. The distal end 50 of the tongue 36 is slotted, forming a "T" shape to minimize flexure 20 mass, and to minimize slider deformation such as crowning and camber. The slider 22 has lateral sides 54 defining a width "w". The tongue 36 is narrower than the width "w" of the slider to minimize slider-flexure assembly 30 width.

Minimizing slider-flexure assembly 30 width at the slider 22 enables slider 22 access to disk surface regions, including disk tracks near the center of the disk, adjacent to the disk drive spindle.

The flexure 20 includes two gimbal beams 52 that extend from the supported end 32 of the flexure 20 to the proximal end 48 of the tongue 36. The flexure 20 includes a bonding segment 58 cantilevered from the flexure 20, between the gimbal beams 52. The bonding segment 58 bonds the flexure 20 to a load beam 18 (FIG. 2).

Figure 5:
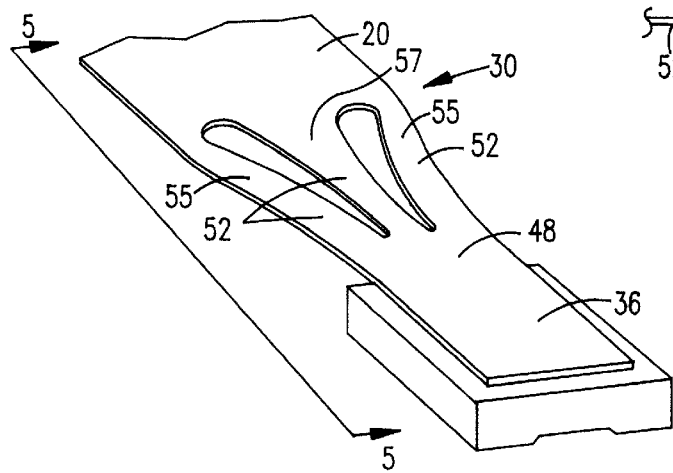
FIG. 5 is a perspective view of another alternative slider-flexure assembly in accordance with the present invention.

FIG. 5 shows another embodiment of the flexure 20. The flexure 20 defines three gimbal beams 52, which diverge from the proximal end 48 of the tongue 36. The gimbal beams 52 include two lateral gimbal beams 55 and a single central gimbal beam 57. The lateral gimbal beams 55 diverge to minimize the width of the slider-flexure assembly 30 at the slider 22. The diverging gimbal beams 55 assure alignment between the slider 22 and the load beam 18 (FIG. 2). The diverging gimbal beams 55 are configured to minimize flexure 20 mass. The gimbal beams 52 are optimized to improve slider 22 compliance to pitch and roll. The lateral gimbal beams 55 are at least partially arcuate in shape, diverging along an arc, and defining arcuate interstices 53 between the gimbal beams 52.

Figure 6:
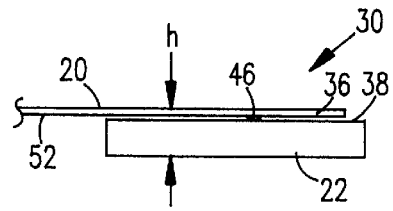
FIG. 6 is a side view of the slider-flexure assembly as seen along the line 5—5 of FIG. 5.

FIG. 6 shows a side view of the slider-flexure assembly 30 of FIG. 6 as seen along the line 5—5. The slider-flexure assembly 30 has a uniform height "h" defined along the slider 22. The flexure 20 is flat. The tongue 36 and gimbal beams 52 are coplanar, lying in alignment on the top 38 of the slider 22. The top 38 of the air bearing slider 22 aligns with the gimbal beam to provide the slider with a positive pitch bias. The gimbal beams 52 are coplanar with the tongue 36 and minimizes the height "h" of the slider-flexure assembly 30 to enable disks to be closely stacked in a disk drive.

What is claimed is:

1. A slider-flexure assembly, comprising:

a slider having a top, a bottom, a leading edge and a trailing edge;

a flexure having a central longitudinal axis and including first and second gimbal beams and a tongue connected to the top of the slider, the tongue having a proximal end and a distal end;

wherein the proximal end of the tongue overhangs the leading edge of the slider; and said first and second gimbal beams extend longitudinally and substantially parallel to said central longitudinal axis from the proximal end of the tongue;

a first lateral gimbal beam along the side of said tongue;

a second lateral gimbal beam along the opposite side of said tongue; and a first central gimbal beam disposed between said first and second gimbal beams and spaced from said first and second gimbal beams by first and second interstices respectively;

wherein the first and second gimbal beams are coplanar with the tongue.

2. A slider-flexure assembly as set forth in claim 1, wherein the gimbal beams diverge from the tongue.

3. A slider-flexure assembly as set forth in claim 1, wherein the gimbal beams have a thickness, and the tongue has a thickness substantially equal to the gimbal beam thickness.

4. A slider-flexure assembly as set forth in claim 1, wherein the slider has lateral sides that overhang the tongue.

5. A slider-flexure assembly as set forth in claim 1, wherein the slider aligns with the gimbal beams to create a positive pitch bias.

6. A slider-flexure assembly, comprising:

a slider having a top, a bottom, a leading edge and a trailing edge;

a flexure having a central longitudinal axis, and a single tongue connected to the top of the slider, the tongue having a proximal end and a distal end, the distal end being relatively narrower than the proximal end;

wherein the proximal end of the tongue overhangs the leading edge of the slider; and gimbal beams extending longitudinally and substantially parallel to said central longitudinal axis from the proximal end of the tongue away from the slider;

said gimbal beams having a first lateral gimbal beam along one side of said tongue;

a second lateral gimbal beam along the opposite side of said tongue; and a first central gimbal beam disposed along said central longitudinal axis between said first and second gimbal beams and spaced from said first and second gimbal beams by first and second interstices respectively, said first gimbal beam and said first interstice being substantially parallel to said one side of said tongue and said second gimbal beam and said second interstice being substantially parallel to said opposite side of said tongue.

7. A slider-flexure assembly as set forth in claim 6, wherein the distal end of the tongue forms a "T" shape.

8. A slider-flexure assembly as set forth in claim 6, wherein the distal end of the tongue has a parabolic contour.

9. A slider-flexure assembly as set forth in claim 6, wherein the flexure includes a bonding surface cantilevered between the gimbal beams.

10. A slider-flexure assembly as set forth in claim 9, wherein the slider has a generally uniform width that exceeds the uniform width of the tongue.

11. A slider-flexure assembly as set forth in claim 9, wherein the gimbal beams diverge.

12. A slider-flexure assembly as in claim 6, wherein said first and second interstices are arcuate.

13. A slider-flexure assembly as in claim 6, further including a second central beam spaced from said first central beam by a central interstice.

14. A slider-flexure assembly as in claim 13, wherein said first, second and central interstices are rectangular.

* * * * *